April 19, 1938. W. C. GOSS 2,114,377
MEANS FOR APPLYING COATINGS
Original Filed March 1, 1935
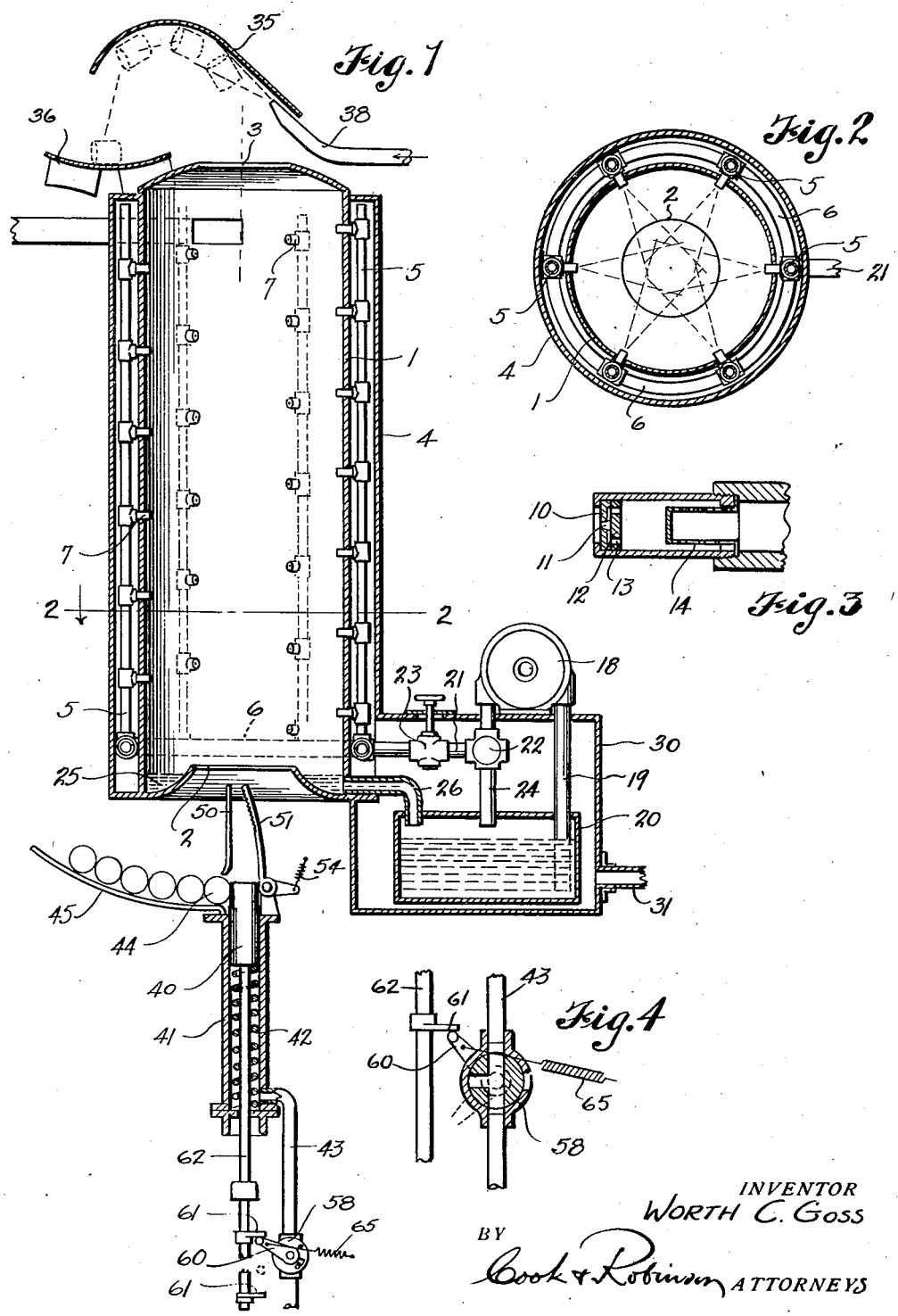
INVENTOR
WORTH C. GOSS
BY
Cook & Robinson ATTORNEYS Patented Apr. 19, 1938

2,114,377

UNITED STATES PATENT OFFICE 2,114,377

MEANS FOR APPLYING COATINGS

Worth C. Goss, Seattle, Wash., assignor to Carlisle Lumber Company, Onalaska, Wash., a corporation of Washington Application March 1, 1935, Serial No. 8,886
Renewed February 25, 1938

6 Claims. (Cl. 91—44)

This invention relates to a means for applying a protective coating to compressed fuel briquettes and the like, and it has reference in particular to the application of a paraffine coating to briquettes made from comminuted wood particles, for the purpose of preventing deterioration or destruction to the briquette due to absorption of atmospheric or free moisture.

Explanatory to this invention, it will be here stated that it is of prime importance that briquettes made from dried sawdust, or the like be protected against absorption of moisture, since this will cause undesirable expansion resulting in deterioration, due to cracking and flaking off, either prior to or during burning, as has been more fully explained in the pending applications of O. P. M. Goss and Worth Goss, 998, filed January 9, 1935, and 3594, filed January 26, 1935. Heretofore, it has been customary to protect such briquettes against moisture by dipping each briquette in a bath of hot, liquid paraffine. While such a coating is satisfactory from the standpoint of protection against moisture absorption, it is entirely unsatisfactory from the standpoint of commercial economy for the reason that dipping results in an undesirable absorption by the briquette, and, in addition, the coating will be of an unnecessary and undesirable thickness.

Experiment has disclosed that for wood briquettes an extremely thin coating of paraffine is ample for the purpose of protection against moisture and that any absorption of the coating by the briquette is neither necessary nor desirable. Also, experiment has disclosed that any method of coating which requires dipping the articles will result in an unnecessarily heavy or thick coating.

In view of the above, it has been the principal object of this invention to provide a method and means whereby an extremely thin coating of paraffine may be evenly applied to the briquettes to give them adequate and desired protection against absorption of atmospheric or free moisture and which provides that no coating material will be absorbed into the surface of the briquette.

More specifically stated, the present invention resides in the application of a paraffine coating to the briquettes by passing them through a mist-like spray of paraffine that is so delivered that it will effect an equal and even application to all their surfaces and an almost instant solidifying of the coating, thereby precluding its being absorbed into the briquette.

Another object of this invention resides in the method used which insures quick-solidifying of the coating by reason of a predetermined differential in temperatures of the briquettes and of the liquid spray.

Other objects reside in the provision of a mechanism whereby the briquettes may be coated in an economical and speedy manner.

Still further objects reside in the provision of a mechanism, comprising an enclosure through which the briquettes are projected, and wherein sprays are arranged to deliver the liquid coating from all directions toward and across the path of travel of the briquettes so that they will be effectively and evenly coated.

Other objects reside in the details of construction and combination of parts whereby the briquettes are automatically fed to the device; whereby they are caused to rotate in their travel and are received after application of the coating in a manner to prevent damage to the coating.

In accomplishing these and other objects of the invention, I have provided the improved details of construction, the preferred forms of which are illustrated in the accompanying drawing, wherein—

Fig. 1 is a central, vertical section of the present preferred mechanism whereby the briquettes may be coated in accordance with the present invention.

Fig. 2 is a horizontal, cross section, as seen on the line 2—2 in Fig. 1.

Fig. 3 is a sectional detail of one of the spray heads.

Fig. 4 is a detail of the control valve construction.

Referring more in detail to the drawing—

In the present preferred form of construction, the device comprises an upright, cylindrical housing I provided with vertically alined opposite end openings 2 and 3. The housing is entirely enclosed, except at the opposite ends, with a jacket 4 providing space for containing a suitable heating medium, such as low pressure steam, whereby the housing and spray delivery pipes, presently described, may be kept in heated condition.

Located within the jacket, at substantially equally spaced intervals about the housing, are vertical pipes 5 which, at their lower ends, connect with a supply header 6 encircling the housing. Arranged at intervals along the pipes are spray heads 7 which project inwardly through the wall of housing I directly toward the axial line of the housing. These spray heads are so arranged on the various pipes 5 that they follow a spiral path extending the length of the housing, each at a different level than the others and arranged to deliver its spray from a different angle relative to the axis of the housing. By reference to Figs. 1 and 2, the alinement of spray heads is indicated and in dotted lines in Fig. 2, is shown the convergence of the sprays relative to the vertical path through the upper and lower end openings of the housing.

In Fig. 3 is a sectional view of a preferred form of spray head wherein the head 7 is shown as having an outer open end within which is fitted a disk 10 with a central aperture 11. A second disk 12, is fitted against the under side of disk 10 and this has passages 13—13 leading to the opening 10 in a manner whereby a whirling spray is caused to issue from the aperture 11. A filtering screen 14 is fitted in the inner end of the head to catch any foreign substance in the liquid to prevent clogging the spray.

The header 6 is supplied with liquid paraffine by means of a pressure pump 18. The pump has its intake side connected by means of a pipe 19 with a source of supply in a container 20, and the delivery side of the pump is connected by a pipe 21 through a pressure relief valve 22 and a control valve 23 with the header. A return pipe 24 leads from the relief valve back into the container 20. The lower end wall of the housing about the opening 2 is upwardly curved to provide a sump 25 into which paraffine delivered from the sprays and not applied to the briquettes, will drain. A drain pipe 26 leads from the sump back into the container 20.

In order that all pipes and the container may be heated, thereby to keep the paraffine in a hot, liquid state, they are enclosed in a housing 30 into which steam is admitted from a steam pipe 31, and it is preferred that the temperature in this housing and that of the jacket be such that the paraffine spray will issue at approximately a temperature of 190 degrees F.

In use of the device, the pump 18 operates to supply the spray head and its discharge or pressure may be regulated by adjustment of the valve 23.

In the machine of Fig. 1, the briquettes to be coated are projected upwardly through the housing and through the openings 2 and 3. The means for projecting them, later described, is so arranged that the briquettes will be carried just beyond the upper end opening and will then engage a deflector plate 35 thereby to be deflected laterally and downwardly into a belt conveyer 36 for delivery to storage or for sacking or crating. An air blast pipe 38 may be arranged, as seen in Fig. 1, to deliver a blast of air laterally along the under side of the deflector plate, thereby to aid in quickly cooling the paraffine as well as to effect a positive lateral displacement of the briquettes into the conveyer 36.

The means provided for projecting the briquettes upwardly through the housing comprises a vertically reciprocating piston 40 in a cylinder 41. The piston is driven upwardly by means of a coiled spring 42 contained in the lower end of the cylinder and it is drawn downwardly by application of vacuum to its under side through a pipe 43. When the piston has been drawn to its lower limit of travel, a briquette, as at 44 in Fig. 1, rolls into its upper end. Then upon release of the vacuum, the spring 42 actuates the piston upwardly, thereby to shoot the briquette up through the housing and easily against the deflector plate 35. In its passage, the briquette follows a definite path, which in this instance is the axial line of the housing, and it is effectively and thoroughly coated with paraffine delivered by the spray heads from all sides into the path of travel.

To further insure an even application of the coating, the briquettes are given a spinning or rotating action as they are projected upwardly and this is effected by causing them to be projected by the piston between two plates 50 and 51; the plate 50 being smooth and parallel with the line of travel while the plate 51 has a roughened surface against which the briquette rubs in passing. This latter plate is pivotally supported at its lower end and is urged toward the other plate by a spring 54 as shown in Fig. 1.

To provide for an automatic operation of the piston 40, a three-way control valve 58 is located in the vacuum pipe connection. The valve plug has a control lever arm 60, whereby it may be rotated between certain limits to cause, at one position, a direct application of vacuum to the cylinder by direct connection with the supply and, at the other position, a release of vacuum. Arms 61—61 are fixed to the piston rod 62 which is arranged to actuate the valve lever at the opposite ends of the piston stroke to automatically control the reciprocating action. A spring 65 is attached to the valve lever 60, as shown, to effect a quick action of the valve to either extremes.

The briquettes travel through the housing along a definite path into which the sprays of liquid paraffine are directed thereby to effectively coat all surfaces of each briquette with a thin coating which can be made more or less thick as desired by a control of the sprays or control of pressure of material or rate of delivery of the briquettes. In each case it is desired that the briquettes shall enter at a temperature of approximately seventy degrees F. and that the paraffine shall be approximately 190 degrees F. This differential of temperature will insure almost instant solidification of the atomized spray when the spray strikes the cooler surfaces of the briquette. If faster cooling is desired, a cold air blast, as at 38 in Fig. 1, may be employed at the delivery end of the housing. It is to be understood also that if it is necessary, the briquettes may be chilled before being delivered into the housing.

With the device of Fig. 1, a quite long cooling period is provided in projecting a briquete upwardly, since at the top of its course, it practically stands still and is then eased into the conveyer as it starts on its downward travel. This method insures an extremely thin coating, and no penetration of the surface of the briquette, thereby giving the necessary protection without any unnecessary waste of material.

Having thus described my invention, what I claim as new therein and desire to secure by Letters Patent is:

1. In a briquette coating device, a housing surrounding a vertically directed path of travel for briquettes, a plurality of spray devices arranged in the housing along the path of travel and directed to discharge sprays of atomized coating material into the path at different levels and means for projecting a briquette through the housing along said path free of contact with any object for reception of a coating of said atomized material.

2. In a briquette coating device, a housing surrounding a vertical path of travel for briquettes, a plurality of spray devices arranged in the housing and along the path of travel, and directed to deliver sprays of coating material into the path from different directions at different levels, means for projecting briquettes through the housing free of contact with any object along said path for reception of the coating material over their surfaces, and means associated with the projecting means for causing the briquettes to rotate while traveling along the path.

3. In a briquette coating device, a housing having upper and lower end openings providing a path of travel through the housing, means located below the housing for projecting briquettes upwardly through the housing by passing through said openings, a plurality of spray devices within the housing arranged along the said path at different levels, means for causing delivery from said sprays of finely atomized coating liquid whereby said briquettes will be coated while passing along the path, a conveyer located adjacent the top opening and means for deflecting the coated briquettes upon projection fom the housing, into said conveyer.

4. In a briquette coating device, a housing surrounding a path of travel, means for causing briquettes to be projected upwardly through the housing along said path, a plurality of spray devices within the housing arranged along the path for delivery of finely atomized coating liquid thereinto whereby the briquettes are coated incident to their being projected along the path, a conveyer, and a deflector plate arranged to receive thereagainst the briquettes projected from the housing and to deflect them into the conveyer, and an air blast device arranged to coact with the plate as an aid in deflecting the briquettes into the conveyer.

5. In a briquette coating device, a housing enclosing a vertical path of travel, means located below the housing to successively project briquettes upwardly through the housing along said path of travel, means at the upper end of the housing for receiving the briquettes, a plurality of spray devices in the housing arranged along the path of travel to discharge thereinto from different directions at different levels, means for delivering atomized material from said spray devices and means for imparting a whirling motion to the projected briquettes in their travel along said path.

6. In a coating machine, in combination, means for projecting articles upwardly along an unobstructed path through a coating medium, a means associated with the projecting means arranged for frictional contact with one side of the projected article prior to its entering the path to impart rotary motion thereto in its travel along said path.

WORTH C. GOSS.